(12) United States Patent
Jiang et al.

(10) Patent No.: US 12,488,472 B2
(45) Date of Patent: Dec. 2, 2025

(54) IMAGE FOREGROUND-BACKGROUND SEGMENTATION METHOD AND SYSTEM BASED ON SPARSE DECOMPOSITION AND GRAPH LAPLACIAN REGULARIZATION

(71) Applicants: Hangzhou Institute of Technology, Xidian University, Hangzhou (CN); Guilin University of Electronic Technology, Guilin (CN); Yangtze Delta Region Institute (Huzhou), University of Electronic Science and Technology of China, Huzhou (CN)

(72) Inventors: Junzheng Jiang, Guilin (CN); Tingfang Tan, Nanning (CN); Jiang Qian, Chengdu (CN)

(73) Assignees: Hangzhou Institute of Technology, Xidian University, Hangzhou (CN); Guilin University of Electronic Technology, Guilin (CN); Yangzte Delta Region Institute (Huzhou), University of Electronic Science and Technology of China, Huzhou (CN)

( * ) Notice: Subject to any disclaimer, the term of this patent is extended or adjusted under 35 U.S.C. 154(b) by 413 days.

(21) Appl. No.: 18/086,582

(22) Filed: Dec. 21, 2022

(65) Prior Publication Data

US 2024/0153100 A1 May 9, 2024

(30) Foreign Application Priority Data

Oct. 26, 2022 (CN) .......................... 202211317605.4

(51) Int. Cl.
*G06T 7/194* (2017.01)
*G06T 7/11* (2017.01)

(52) U.S. Cl.
CPC ................ *G06T 7/194* (2017.01); *G06T 7/11* (2017.01)

(58) Field of Classification Search
CPC . G06T 7/194; G06T 7/11; G06T 2207/20021; G06T 2207/30176;
(Continued)

(56) References Cited

U.S. PATENT DOCUMENTS

2015/0030231 A1* 1/2015 Porikli .................... G06T 7/162
382/173

OTHER PUBLICATIONS

Zhejiang University Press. (n.d.). Image foreground-background segmentation method based on sparse decomposition and graph Laplacian regularization. academax. https://doi.org/10.3785/j.issn.1008-973X.2024.05.011 (Year: 2024).*

(Continued)

*Primary Examiner* — Gregory A Morse
*Assistant Examiner* — Renae A Bitor
(74) *Attorney, Agent, or Firm* — Zhigang Ma (57) ABSTRACT

An image foreground-background segmentation method and system based on sparse decomposition and graph Laplacian regularization are disclosed. Firstly, an image is divided into a plurality of non-overlapping image blocks; Then, a foreground-background segmentation model of the image is established according to the image blocks; An image segmentation problem is divided into several sub-problems, which are solved by iteration; Finally, after the iteration, solutions of the problem are obtained; The obtained solutions are respectively matrixed and patched to obtain a foreground image, which is a foreground image of the whole image. The image foreground-background segmentation method uses the linear combination of graph Fourier basis functions to better represent the smooth background region. In addition, the graph Laplacian regularization is used to characterize the connectivity of foreground text and graphics (Continued)

while keeping sharp foreground text and graphics contours. The experimental results show that this method has better foreground-background segmentation effect.

9 Claims, 5 Drawing Sheets

(58) Field of Classification Search
CPC ......... G06T 7/162; G06T 7/168; G06T 7/187; G06V 10/267; G06V 10/457
See application file for complete search history.

(56) References Cited

OTHER PUBLICATIONS

Chen, F., Cheung, G., & Zhang, X. (Apr. 2024). Soft image segmentation using gradient graph laplacian regularizer. In ICASSP 2024-2024 IEEE International Conference on Acoustics, Speech and Signal Processing (ICASSP) (pp. 9526-9530). IEEE. (Year: 2024).*

Sha, L., Schonfeld, D., & Wang, J. (2019). Graph Laplacian regularization with sparse coding for image restoration and representation. IEEE Transactions on Circuits and Systems for Video Technology, 30(7), 2000-2014. (Year: 2019).*

Zhang, Lianbo, Dapeng Tao, and Weifeng Liu. "Laplacian regularized active learning for image segmentation." Proceedings 2014 IEEE International Conference on Security, Pattern Analysis, and Cybernetics (SPAC). IEEE, 2014. (Year: 2014).*

Minaee, S. (2018). Image Segmentation Using Subspace Representation and Sparse Decomposition (Doctoral dissertation, New York University Tandon School of Engineering). (Year: 2018).*

Minaee, S., & Wang, Y. (Sep. 2016). Screen content image segmentation using sparse decomposition and total variation minimization. In 2016 IEEE International Conference on Image Processing (ICIP) (pp. 3882-3886). IEEE. (Year: 2016).*

* cited by examiner

IMAGE FOREGROUND-BACKGROUND SEGMENTATION METHOD AND SYSTEM BASED ON SPARSE DECOMPOSITION AND GRAPH LAPLACIAN REGULARIZATION

TECHNICAL FIELD

The disclosure relates to the technical field of image processing, particularly to an image foreground-background segmentation method based on sparse decomposition and graph Laplacian regularization.

BACKGROUND

The foreground-background segmentation of images, that is, trying to decompose an image into foreground and background components, plays a fundamental role in image processing and computer vision applications, such as image compression, medical image segmentation and text extraction. As an important preprocessing step in some image applications, the foreground-background segmentation plays an important role in the subsequent processing.

At present, many foreground-background segmentation algorithms for still images have been proposed. Among them, Tony Lin proposed compound image compression for real-time computer screen image transmission, Shervin Minaee proposed screen content image segmentation using least absolute deviation fitting (abbreviated as LAD method), Shervin Minaee proposed screen content image segmentation using sparse decomposition and total variation minimization (abbreviated as SDTV method), etc. The LAD method fitted a smooth model to an image and divided pixels into background or foreground, but there were isolated points in the segmented foreground. On the basis of sparse decomposition, the SDTV method used total variation minimization for a foreground component, which promoted the connectivity of foreground pixels and made the segmentation effect better than the LAD method. However, these methods still could not effectively characterize the high correlations between pixels.

Therefore, a method to improve the foreground-background segmentation effect of images needs to be further introduced.

SUMMARY

In view of this, a purpose of the disclosure is to provide an image foreground-background segmentation method based on sparse decomposition and graph Laplacian regularization, which can improve the depiction effect of pixel correlation and promote the connectivity of foreground pixels, thus improving the foreground-background segmentation effect of images.

In order to achieve the above purpose, the disclosure provides a technical scheme as follows.

The disclosure provides an image foreground-background segmentation method based on sparse decomposition and graph Laplacian regularization, which includes the following steps:

step 1) dividing an image into a plurality of non-overlapping image blocks;

step 2) establishing a foreground-background segmentation model of the image block, where the foreground-background segmentation model is expressed as follows:

$$\min_{s_r, \alpha_r} \|\alpha_r\|_0 + \tau \|s_r\|_0 + \gamma s_r^T L_{G_r} s_r \qquad (3)$$

$$\text{s.t.} \quad f_r = P_r \alpha_r + s_r$$

where $r=1, \ldots, r_{max}$; $\tau$ and $\gamma$ are regularization parameters; $\|\alpha_r\|_0$ represents minimizing the nonzeros entries of the parameter $\alpha_r$ by using l0-norm; $\|s_r\|_0$ represents foreground pixels $s_r$ where the number of non-zero components should be smaller; $s_r^T L_{G_r} s_r$ represents a graph Laplacian regularization term, which is used to characterize the connectivity of foreground text and graphics; $f_r = P_r \alpha_r + s_r$ represents a constrain term; $f_r$ corresponds to vectorization of $F_r(x,y)$ and $s_r$ corresponds to vectorization of $S_r(x,y)$; $P_r$ is a matrix with a size $l^2 \times M$, and $\alpha_r = [\alpha_{r,1}, \ldots, \alpha_{r,M}]^T$;

step 3) using a l1-norm to deal with a convex problem according to the foreground-background segmentation model, and obtaining the following problem:

$$\min_{s_r, \alpha_r} \|\alpha_r\|_1 + \tau \|s_r\|_1 + \gamma s_r^T L_{G_r} s_r \qquad (4)$$

$$\text{s.t.} \quad f_r = P_r \alpha_r + s_r$$

step 4) dividing the above problem into a plurality of sub-problems, and solving the plurality of sub-problems by iteration according to the foreground-background segmentation model of the image established by formula (3);

step 5) after the iteration of the above step 4), obtaining the solutions $s_r$ ($r=1, \ldots, r_{max}$) of above problem; matrixing $s_r$, and patching the $s_r$ into S, which is the foreground image of the whole image.

In an embodiment, the plurality of non-overlapping image blocks in step 1) are obtained by the following manner:

dividing the image into $r_{max}$ numbers of non-overlapping image blocks; where in each of the non-overlapping image blocks has a size of l×l, and the r-th image block is expressed as formula (1):

$$F_r(x,y) = \Sigma_{m=1}^{M} \alpha_{r,m} P_{r,m}(x,y) + S_r(x,y) \qquad (1)$$

where $r=1, \ldots, r_{max}$; x represents a horizontal coordinate and y represents a vertical coordinate; $\Sigma_{m=1}^{M} \alpha_{r,m} P_{r,m}(x,y)$ corresponds to a smooth background region, $P_{r,m}(x,y)$ represents a graph Fourier basis; $\alpha_{r,m}$ represents a model parameter; $S_r(x,y)$ corresponds to the foreground pixels;

by vectorizing the matrices into the vectors, recasting the above formula (1) as follows:

$$f_r = P_r \alpha_r + s_r \qquad (2)$$

where $f_r$ corresponds to the vectorization of $F_r(x,y)$ and $s_r$ corresponds to the vectorization of $S_r(x,y)$; $P_r$ is the matrix with the size $l^2 \times M$, and $\alpha_r = [\alpha_{r,1}, \ldots, \alpha_{r,M}]^T$.

In an embodiment, the plurality of sub-problems in step 4) are obtained by the following manner:

before using an alternating direction method of multipliers to solve the above problem, and rewriting the above problem equivalently as follows:

$$\min_{\alpha_r, x_r, y_r, s_r} \|x_r\|_1 + \tau \|y_r\|_1 + \gamma s_r^T L_{G_r} s_r \qquad (5)$$

$$\text{s.t.} \quad x_r = \alpha_r, \; y_r = f_r - P_r \alpha_r, \; y_r = s_r$$

where $x_r$ is an auxiliary variable, which is equivalent to $\alpha_r$ before equivalent rewriting; $y_r$ is another auxiliary variable, which is equivalent to $s_r$ before equivalent rewriting, so as to facilitate the subsequent use of the alternating direction method of multipliers.

using the alternating direction method of multipliers to express an augmented Lagrangian function of the above problem as follows:

$$\ell(\alpha_r, x_r, y_r, s_r, u_r, v_r, w_r) = \|x_r\|_1 + \tau\|y_r\|_1 + \gamma s_r^T L_{\mathcal{G}_r} s_r + \quad (6)$$

$$\langle u_r, x_r - \alpha_r\rangle + \langle v_r, y_r + P_r\alpha_r - f_r\rangle + \langle w_r, y_r - s_r\rangle +$$

$$\frac{\rho}{2}(\|x_r - \alpha_r\|_2^2 + \|y_r + P_r\alpha_r - f_r\|_2^2 + \|y_r - s_r\|_2^2)$$

where $u_r$, $v_r$, $w_r$ represent Lagrange multipliers of a dual variable; $\langle \bullet,\bullet \rangle$ represents an inner product; $\rho$ represents a penalty parameter; and $L_{\mathcal{G}_r}$ represents a graph Laplacian matrix;

dividing the above problem into the plurality of sub-problems and solving them one by one by the iteration:

$$\alpha_r^{(k+1)} = \underset{\alpha_r}{\operatorname{argmin}}\, \ell(\alpha_r, x_r^{(k)}, y_r^{(k)}, s_r^{(k)}, u_r^{(k)}, v_r^{(k)}, w_r^{(k)}) \quad (7)$$

$$x_r^{(k+1)} = \underset{x_r}{\operatorname{argmin}}\, \ell(\alpha_r^{(k+1)}, x_r, y_r^{(k)}, s_r^{(k)}, u_r^{(k)}, v_r^{(k)}, w_r^{(k)}) \quad (8)$$

$$y_r^{(k+1)} = \underset{y_r}{\operatorname{argmin}}\, \ell(\alpha_r^{(k+1)}, x_r^{(k+1)}, y_r, s_r^{(k)}, u_r^{(k)}, v_r^{(k)}, w_r^{(k)}) \quad (9)$$

$$s_r^{(k+1)} = \underset{s_r}{\operatorname{argmin}}\, \ell(\alpha_r^{(k+1)}, x_r^{(k+1)}, y_r^{(k+1)}, s_r, u_r^{(k)}, v_r^{(k)}, w_r^{(k)}) \quad (10)$$

$$u_r^{(k+1)} = u_r^{(k)} + \rho(x_r^{(k+1)} - \alpha_r^{(k+1)}) \quad (11)$$

$$v_r^{(k+1)} = v_r^{(k)} + \rho(y_r^{(k+1)} + P_r\alpha_r^{(k+1)} - f_r) \quad (12)$$

$$w_r^{(k+1)} = w_r^{(k)} + \rho(y_r^{(k+1)} - s_r^{(k+1)}) \quad (13)$$

where $\underset{\bullet}{\operatorname{argmin}} *$ represents a value of the symbol $\bullet$ when the formula $*$ reaches the minimum value; k represents the k-th iteration; $*^{(k+1)}$ represents a result of the formula $*$ after the (k+1)-th iteration; and $*^{(k)}$ represents a result of the formula $*$ after the k-th iteration.

In an embodiment, solving the plurality of sub-problems by the iteration, includes:

extracting all terms containing $\alpha_r$, $x_r$, $y_r$, $s_r$ from formula (6) respectively;

determining termination conditions of the iteration, and stopping the iteration in response to the termination conditions being met; the termination conditions of the iteration are as follows:

$$\|x_r^{(k+1)} - \alpha_r^{(k+1)}\|_\infty \leq \varepsilon_1,\ \|y_r^{(k+1)} + P_r\alpha_r^{(k+1)} - f_r\|_\infty \leq \varepsilon_2,\ \text{and}\ \|y_r^{(k+1)} - s_r^{(k+1)}\|_\infty \leq \varepsilon_3;$$

where $\|\bullet\|_\infty$ is an infinite norm, which represents the maximum absolute value of all elements in a vector; $\varepsilon_1$, $\varepsilon_2$, and $\varepsilon_3$ are numbers as small as possible, and are constraint parameters respectively; $\alpha_r^{(k+1)}$ represents a result of $\alpha_r$ after the (k+1)-th iteration; $s_r^{(k+1)}$ represents a result of $s_r$ after the (k+1)-th iteration; $x_r^{(k+1)}$ represents a result of $x_r$ after the (k+1)-th iteration; $x_r$ represents an auxiliary variable, which is equivalent to $\alpha_r$; $y_r^{(k+1)}$ represents a result of $y_r$ after the (k+1)-th iteration; $y_r$ represents an auxiliary variable, which is equivalent to $s_r$.

In an embodiment, in step 4), all terms containing $\alpha_r$ are extracted from formula (6) and the first sub-problem is solved by the following manner:

$$\alpha_r^{(k+1)} = \underset{\alpha_r}{\operatorname{argmin}} \langle u_r^{(k)}, x_r^{(k)} - \alpha_r\rangle + \langle v_r^{(k)}, y_r^{(k)} + P_r\alpha_r - f_r\rangle + \quad (14)$$

$$\frac{\rho}{2}(\|x_r^{(k)} - \alpha_r\|_2^2 + \|y_r^{(k)} + P_r\alpha_r - f_r\|_2^2)$$

a problem of formula (14) is a least squares problem, which has a closed-form solution as follows:

$$\alpha_r^{(k+1)} = (\rho I + \rho P_r^T P_r)^{-1}(u_r^{(k)} - P_r^T v_r^{(k)} + \rho x_r^{(k)} + \rho P_r^T(f_r - y_r^{(k)})) \quad (15)$$

where I represent a identity matrix.

In an embodiment, in step 4), all terms containing $x_r$ are extracted from formula (6) and a soft thresholding shrinkage operator is used to solve the second sub-problem by the following manner:

$$x_r^{(k+1)} = \underset{x_r}{\operatorname{argmin}}\ \|x_r\|_1 + \langle u_r^{(k)}, x_r - \alpha_r^{(k+1)}\rangle + \quad (16)$$

$$\frac{\rho}{2}\|x_r - \alpha_r^{(k+1)}\|_2^2 = \underset{x_r}{\operatorname{argmin}}\ \|x_r\|_1 + \frac{\rho}{2}\left\|x_r - \left(\alpha_r^{(k+1)} - \frac{u_r^{(k)}}{\rho}\right)\right\|_2^2$$

by referring to the following soft thresholding shrinkage operator:

$$\operatorname{soft}(\phi, \Delta) = \begin{cases} \phi - \Delta, & \phi > \Delta \\ \phi + \Delta, & \phi < -\Delta \\ 0, & \text{otherwise} \end{cases} \quad (17)$$

where $\phi \in \mathbb{R}$, $\Delta > 0$; and a solution of the second sub-problem of $x_r$ is as follows:

$$x_r^{(k+1)} = \operatorname{soft}\left(\alpha_r^{(k+1)} - \frac{u_r^{(k)}}{\rho}, \frac{1}{\rho}\right) \quad (18)$$

where $\phi$ represents a variable; $\mathbb{R}$ represents a set of real numbers; $\Delta$ represents a threshold value.

In an embodiment, in step 4), all terms containing $y_r$ are extracted from formula (6), and the soft thresholding shrinkage operator is used to solve the third sub-problem by the following manner:

$$y_r^{(k+1)} = \underset{y_r}{\operatorname{argmin}}\ \tau\|y_r\|_1 + \langle v_r^{(k)}, y_r + P_r\alpha_r^{(k+1)} - f_r\rangle + \quad (19)$$

$$\langle w_r^{(k)}, y_r - s_r^{(k)}\rangle + \frac{\rho}{2}(\|y_r + P_r\alpha_r^{(k+1)} - f_r\|_2^2 + \|y_r - s_r^{(k)}\|_2^2) =$$

$$\underset{y_r}{\operatorname{argmin}}\ \tau\|y_r\|_1 + \rho\left\|y_r - \frac{1}{2}\left(f_r + s_r^{(k)} - P_r\alpha_r^{(k+1)} - \frac{1}{\rho}(v_r^{(k)} + w_r^{(k)})\right)\right\|_2^2 =$$

$$\operatorname{soft}\left(\frac{1}{2}\left(f_r + s_r^{(k)} - P_r\alpha_r^{(k+1)} - \frac{1}{\rho}(v_r^{(k)} + w_r^{(k)})\right), \frac{\tau}{2\rho}\right)$$

where $\tau$ represents the regularization parameter.

In an embodiment, in step 4), all terms containing $s_r$ are extracted from formula (6), and a fourth sub-problem is solved by the following manner:

$$s_r^{(k+1)} = \underset{s_r}{\mathrm{argmin}}\ \gamma s_r^T L_{\mathcal{G}_r} s_r + \langle w_r^{(k)}, y_r^{(k)} - s_r \rangle +$$

$$\frac{\rho}{2}\|y_r^{(k+1)} - s_r\|_2^2 \Big) = (2\gamma L_{\mathcal{G}_r} + \rho I)^{-1}(w_r^{(k)} + \rho y_r^{(k+1)})$$ (20)

where $u_r$ is obtained after the iteration:

$$u_r^{(k+1)} = u_r^{(k)} + \rho(x_r^{(k+1)} - \alpha_r^{(k+1)}) \quad (21)$$

where $v_r$ is obtained after the iteration:

$$v_r^{(k+1)} = v_r^{(k)} + \rho(y_r^{(k+1)} + P_r \alpha_r^{(k+1)} - f_r) \quad (22)$$

where $w_r$ is obtained after the iteration:

$$w_r^{(k+1)} = w_r^{(k)} + \rho(y_r^{(k+1)} - s_r^{(k+1)}) \quad (23)$$

where $L_{\mathcal{G}_r}$ represents the graph Laplacian matrix.

In addition, the disclosure provides an image foreground-background segmentation system based on sparse decomposition and graph Laplacian regularization, including a memory, a processor and a computer program stored in the memory and executable on the processor, and the processor is configured, when executes the computer program, to implements the above method.

The disclosure has the advantages that:
compared with the existing image foreground-background segmentation methods, the image foreground-background segmentation method based on sparse decomposition and graph Laplacian regularization provided by the disclosure uses the linear combination of graph Fourier basis functions to better represent the smooth background region. In addition, the graph Laplacian regularization is used to characterize the connectivity of foreground text and graphics while keeping sharp foreground text and graphics contours. The experimental results show that the method provided by the disclosure has better foreground-background segmentation effect.

Other advantages, purposes and features of the disclosure will be set forth in part in the following description, and in part will be obvious to those skilled in the art based on the following study, or may be taught by the practice of the disclosure. The purposes and other advantages of the disclosure can be realized and obtained by the following description.

BRIEF DESCRIPTION OF DRAWINGS

In order to make purposes, technical schemes and beneficial effects of the disclosure clearer, the disclosure provides the following drawings for illustration.

DETAILED DESCRIPTION OF EMBODIMENTS

The disclosure will be further explained with reference to the following drawings and specific embodiments, so that those skilled in the art can better understand the disclosure and implement it. However, the embodiments cited are not to be taken as limitations of the disclosure.

Embodiment 1

Please refer to FIG. 1 to FIG. 5, an embodiment of the disclosure provides an image foreground-background segmentation method based on sparse decomposition and graph Laplacian regularization, including steps as follows.

Step 1) an image is divided to $r_{max}$ numbers of non-overlapping image blocks with the size of l×l, and the r-th image block is expressed as:

$$F_r(x,y) = \Sigma_{m=1}^M \alpha_{r,m} P_{r,m}(x,y) + S_r(x,y) \quad (1)$$

where $r=1, \ldots, r_{max}$; x represents a horizontal coordinate and y represents a vertical coordinate; $\Sigma_{m=1}^M \alpha_{r,m} P_{r,m}(x,y)$ corresponds to a smooth background region, $P_{r,m}(x,y)$ represents a graph Fourier basis; $\alpha_{r,m}$ represents a model parameter; $S_r(x,y)$ corresponds to foreground pixels. By vectorizing the matrix into the vector, the above formula (1) is re-described as follows:

$$f_r = P_r \alpha_r + s_r \quad (2)$$

where $f_r$ corresponds to the vectorization of $F_r(x,y)$ and $s_r$ corresponds to the vectorization of $S_r(x,y)$; $P_r$ is the matrix with the size $l^2 \times M$, and $\alpha_r = [\alpha_{r,1}, \ldots, \alpha_{r,M}]^T$.

Step 2) a foreground-background segmentation model of the image is established according to the image representation method in step 1), and the foreground-background segmentation model is expressed as follows:

$$\underset{s_r, \alpha_r}{\min} \|\alpha_r\|_0 + \tau\|s_r\|_0 + \gamma s_r^T L_{\mathcal{G}_r} s_r \quad (3)$$

$$\text{s.t.}\ f_r = P_r \alpha_r + s_r$$

where τ and γ are regularization parameters; $\|\alpha_r\|_0$ represents minimizing the nonzeros entries of the parameter $\alpha_r$ by using l0-norm, so as to avoid over-fitting of the smooth model on the foreground pixels; $\|s_r\|_0$ represents foreground pixels $s_r$ with smaller number of non-zero components; $s_r^T L_{\mathcal{G}_r} s_r$ represents a graph Laplacian regularization term, which is used to characterize the connectivity of foreground text and graphics; and $f_r = P_r \alpha_r + s_r$ represents a constrain term;

Step 3) according to the foreground-background segmentation model in step 2), for the first two terms, because the l0-norm is non-convex, its approximate l1-norm is used to deal with the convex problem. The above problem is equivalently rewritten as follows:

$$\underset{s_r, \alpha_r}{\min} \|\alpha_r\|_1 + \tau\|s_r\|_1 + \gamma s_r^T L_{\mathcal{G}_r} s_r \quad (4)$$

$$\text{s.t.}\ f_r = P_r \alpha_r + s_r$$

Step 4) The model is solved according to the model established in step 3):

The alternating direction method of multipliers (ADMM) is used to solve the above problem. Firstly, the above problem is equivalently rewritten as follows:

$$\min_{\alpha_r, x_r, y_r, s_r} \|x_r\|_1 + \tau\|y_r\|_1 + \gamma s_r^T L_{G_r} s_r \tag{5}$$

$$\text{s.t. } x_r = \alpha_r, \ y_r = f_r - P_r\alpha_r, \ y_r = s_r$$

where $x_r$ is equivalent to $\alpha_r$ before equivalent rewriting, $y_r$ is equivalent to $s_r$ before equivalent rewriting, so as to facilitate the subsequent use of the ADMM.

The ADMM is used to express an augmented Lagrangian function of the above problem as follows:

$$\ell(\alpha_r, x_r, y_r, s_r, u_r, v_r, w_r) = \tag{6}$$

$$\|x_r\|_1 + \tau\|y_r\|_1 + \gamma s_r^T L_{G_r} s_r + \langle u_r, x_r - \alpha_r \rangle +$$

$$\langle v_r, y_r + P_r\alpha_r - f_r \rangle + \langle w_r, y_r - s_r \rangle +$$

$$\frac{\rho}{2}\left(\|x_r - \alpha_r\|_2^2 + \|y_r + P_r\alpha_r - f_r\|_2^2 + \|y_r - s_r\|_2^2\right)$$

where $u_r$, $v_r$, $w_r$ represent Lagrange multipliers of a dual variable; $\langle \cdot, \cdot \rangle$ represents an inner product, $\rho$ represents a penalty parameter, and $L_{G_r}$ represents a graph Laplacian matrix.

The above problem is divided to a plurality of sub-problems, and the plurality of sub-problems are solved one by one by iteration:

$$\alpha_r^{(k+1)} = \underset{\alpha_r}{\text{argmin}} \ \ell(\alpha_r, x_r^{(k)}, y_r^{(k)}, s_r^{(k)}, u_r^{(k)}, v_r^{(k)}, w_r^{(k)}) \tag{7}$$

$$x_r^{(k+1)} = \underset{x_r}{\text{argmin}} \ \ell(\alpha_r^{(k+1)}, x_r, y_r^{(k)}, s_r^{(k)}, u_r^{(k)}, v_r^{(k)}, w_r^{(k)}) \tag{8}$$

$$y_r^{(k+1)} = \underset{y_r}{\text{argmin}} \ \ell(\alpha_r^{(k+1)}, x_r^{(k+1)}, y_r, s_r^{(k)}, u_r^{(k)}, v_r^{(k)}, w_r^{(k)}) \tag{9}$$

$$s_r^{(k+1)} = \underset{s_r}{\text{argmin}} \ \ell(\alpha_r^{(k+1)}, x_r^{(k+1)}, y_r^{(k+1)}, s_r, u_r^{(k)}, v_r^{(k)}, w_r^{(k)}) \tag{10}$$

$$u_r^{(k+1)} = u_r^{(k)} + \rho(x_r^{(k+1)} - \alpha_r^{(k+1)}) \tag{11}$$

$$v_r^{(k+1)} = v_r^{(k)} + \rho(y_r^{(k+1)} + P_r\alpha_r^{(k+1)} - f_r) \tag{12}$$

$$w_r^{(k+1)} = w_r^{(k)} + \rho(y_r^{(k+1)} - s_r^{(k+1)}) \tag{13}$$

where $\underset{\cdot}{\text{argmin}} *$ represents a value of the symbol $\bullet$ when the formula $*$ reaches a minimum value; k represents the k-th iteration; $*^{(k+1)}$ represents a result of the formula $*$ after the (k+1)-th iteration; and $*^{(k)}$ represents a result of the formula $*$ after the k-th iteration.

Therefore, the above problem is turned to solve four main sub-problems $\alpha_r$, $x_r$, $y_r$, $s_r$.

All terms containing $\alpha_r$ are extracted from formula (6), and the first sub-problem is solved as follows.

$$\alpha_r^{(k+1)} = \underset{\alpha_r}{\text{argmin}} \langle u_r^{(k)}, x_r^{(k)} - \alpha_r \rangle + \langle v_r^{(k)}, y_r^{(k)} + P_r\alpha_r - f_r \rangle + \tag{14}$$

$$\frac{\rho}{2}\left(\|x_r^{(k)} - \alpha_r\|_2^2 + \|y_r^{(k)} + P_r\alpha_r - f_r\|_2^2\right)$$

The problem of formula (14) is a least squares problem, which has a closed-form solution as follows:

$$\alpha_r^{(k+1)} = (\rho I + \rho P_r^T P_r)^{-1}(u_r^{(k)} - P_r^T v_r^{(k)} + \rho x_r^{(k)} + \rho P_r^T (f_r - y_r^{(k)})) \tag{15}$$

All terms containing $x_r$ are extracted from formula (6), and the soft thresholding shrinkage operator is used to solve the second sub-problem as follows.

$$x_r^{(k+1)} = \underset{x_r}{\text{argmin}} \ \|x_r\|_1 + \langle u_r^{(k)}, x_r - \alpha_r^{(k+1)} \rangle + \tag{16}$$

$$\frac{\rho}{2}\|x_r - \alpha_r^{(k+1)}\|_2^2 = \underset{x_r}{\text{argmin}} \ \|x_r\|_1 + \frac{\rho}{2}\left\|x_r - \left(\alpha_r^{(k+1)} - \frac{u_r^{(k)}}{\rho}\right)\right\|_2^2$$

Referring to the following soft thresholding shrinkage operator:

$$\text{soft}(\phi, \Delta) = \begin{cases} \phi - \Delta, & \phi > \Delta \\ \phi + \Delta, & \phi < -\Delta \\ 0, & \text{otherwise} \end{cases} \tag{17}$$

where $\phi \in \mathbb{R}$, $\Delta > 0$, the solution of the second sub-problem $x_r$ is as follows:

$$x_r^{(k+1)} = \text{soft}\left(\alpha_r^{(k+1)} - \frac{u_r^{(k)}}{\rho}, \frac{1}{\rho}\right) \tag{18}$$

where $\phi$ represents a variable; $\mathbb{R}$ represents a set of real numbers; $\Delta$ represents a threshold value.

All terms containing $y_r$ are extracted from formula (6) and the third sub-problem is solved by using the soft thresholding shrinkage operator:

$$y_r^{(k+1)} = \underset{y_r}{\text{argmin}} \tau\|y_r\|_1 + \langle v_r^{(k)}, y_r + P_r\alpha_r^{(k+1)} - f_r \rangle + \tag{19}$$

$$\langle w_r^{(k)}, y_r - s_r^{(k)} \rangle + \frac{\rho}{2}\left(\|y_r + P_r\alpha_r^{(k+1)} - f_r\|_2^2 + \|y_r - s_r^{(k)}\|_2^2\right) =$$

$$\underset{y_r}{\text{argmin}} \tau\|y_r\|_1 + \rho\left\|y_r - \frac{1}{2}\left(f_r + s_r^{(k)} - P_r\alpha_r^{(k+1)} - \frac{1}{\rho}(v_r^{(k)} + w_r^{(k)})\right)\right\|_2^2 =$$

$$\text{soft}\left(\frac{1}{2}\left(f_r + s_r^{(k)} - P_r\alpha_r^{(k+1)} - \frac{1}{\rho}(v_r^{(k)} + w_r^{(k)})\right), \frac{\tau}{2\rho}\right)$$

where $\tau$ represents the regularization parameter.

All terms containing $s_r$ are extracted from formula (6) and the fourth sub-problem is solved as follows:

$$s_r^{(k+1)} = \underset{s_r}{\text{argmin}} \gamma s_r^T L_{G_r} s_r + \langle w_r^{(k)}, y_r^{(k)} - s_r \rangle + \frac{\rho}{2}\|y_r^{(k+1)} - s_r\|_2^2 = \tag{20}$$

$$(2\gamma L_{G_r} + \rho I)^{-1}(w_r^{(k)} + \rho y_r^{(k+1)})$$

$u_r$ is obtained after the iteration:

$$u_r^{(k+1)} = u_r^{(k)} + \rho(x_r^{(k+1)} - \alpha_r^{(k+1)}) \tag{21}$$

$v_r$ is obtained after the iteration:

$$v_r^{(k+1)} = v_r^{(k)} + \rho(y_r^{(k+1)} + P_r\alpha_r^{(k+1)} - f_r) \tag{22}$$

$w_r$ is obtained after the iteration:

$$w_r^{(k+1)} = w_r^{(k)} + \rho(y_r^{(k+1)} - s_r^{(k+1)}) \tag{23}$$

The termination conditions of the iteration is determined, and the iteration is stopped if the termination conditions are met. The termination conditions of the iteration are as follows:

$$\|x_r^{(k+1)} - \alpha_r^{(k+1)}\|_\infty \leq \varepsilon_1, \|y_r^{(k+1)} + P_r\alpha_r^{(k+1)} - f_r\|_\infty \leq \varepsilon_2, \text{ and}$$
$$\|y_r^{(k+1)} - s_r^{(k+1)}\|_\infty \leq \varepsilon_3;$$

After the iteration of the above step, the solutions of $s_r$ obtained are the solutions of formula (5).

Step 5) $s_1, \ldots, s_{r_{max}}$ are matrixed and then re-integrated to obtain a foreground image S, i.e., a foreground image of the whole image.

The precision, recall and F1 score of the obtained foreground map and ground truth foreground are calculated to evaluate the superiority of the segmentation effect.

Simulation Example 1

In this example, a manually generated synthetic image is input, that is, a foreground component is inserted into a smooth background image. In this example, the number of graph Fourier basis functions, M, is selected to be 10. Meanwhile, the block size is selected to be l=64, and the regularization parameters are set to $\tau$=0.15 and $\gamma$=0.05, and the constraint parameters are set to $\varepsilon_1=\varepsilon_2=\varepsilon_3=10^{-6}$.

Figure 1:
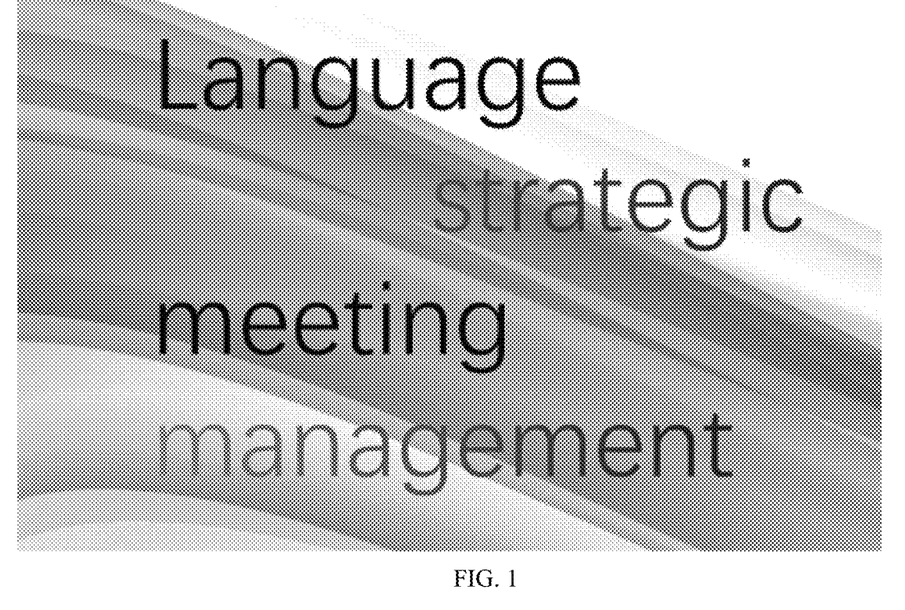
FIG. 1 shows an original synthetic image in a simulation example 1.
Figure 2:
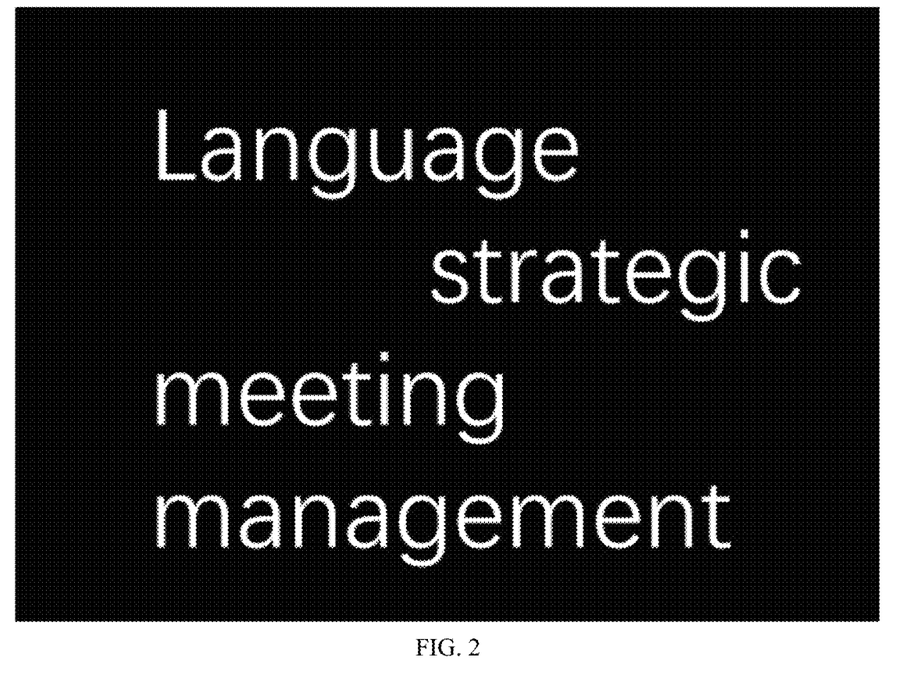
FIG. 2 shows a ground truth foreground in the simulation example 1.
Figure 3:
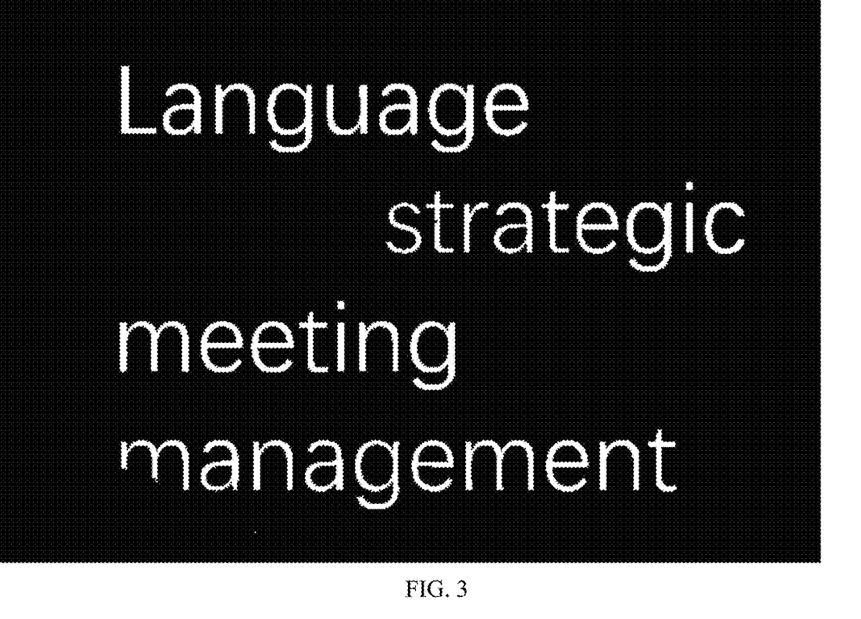
FIG. 3 shows a foreground map by the technical scheme of the disclosure in the simulation example 1.
Figure 4:
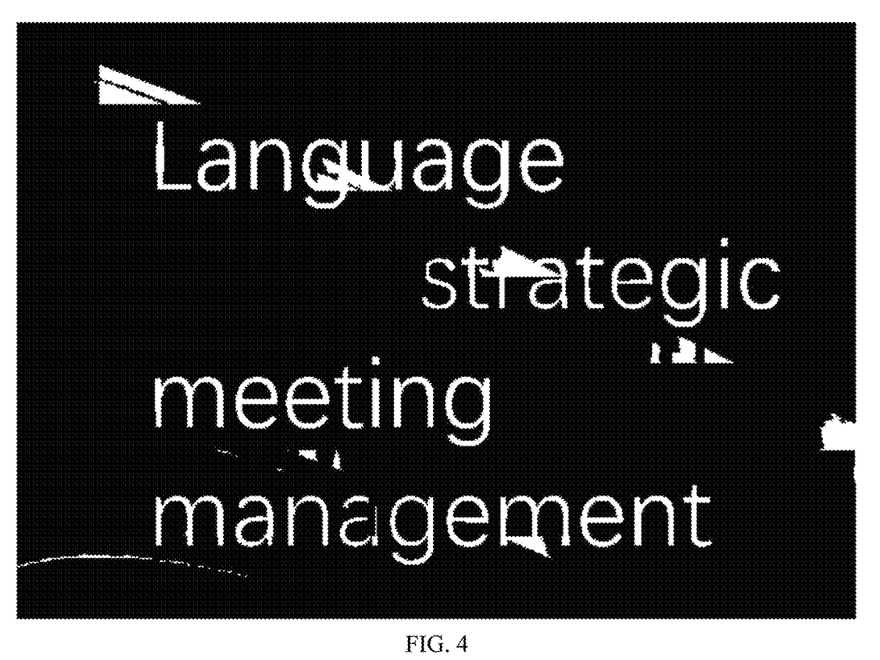
FIG. 4 shows a foreground map by the LAD method in the simulation example 1.
Figure 5:
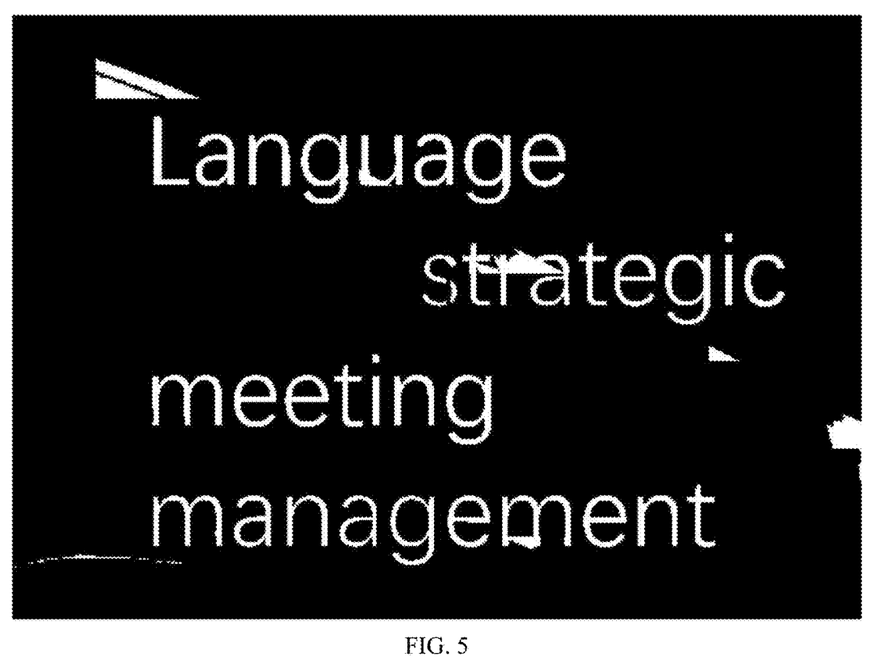
FIG. 5 shows a foreground map by the SDTV method in the simulation example 1.

The synthetic image is input into the model in the technical scheme of the disclosure, and comparison of segmentation foreground images are shown in FIG. 1 to FIG. 5, in which FIG. 1 shows an original image, FIG. 2 shows a ground truth foreground, FIG. 3 shows a foreground map by the technical scheme of the disclosure, FIG. 4 shows a foreground map by the LAD method, and FIG. 5 shows a foreground map by the SDTV method. It can be observed that the segmentation effect of the model in the technical scheme of the disclosure is the best. Compared with the least absolute deviations (shorted as LAD) method and the sparse decomposition and total variation minimization (SDTV) method, the precision, recall and F1 score of the foreground images segmented by the technical scheme of disclosure and the above methods are calculated according to the ground truth foreground. The results are shown in Table 1, and it can be observed that the technical scheme of the disclosure is superior to the above existing methods.

TABLE 1

Performance measurement of segmentation results

| Segmentation algorithm | Precision | Recall | F1 |
|---|---|---|---|
| LAD | 80.83% | 82.08% | 81.45% |
| SDTV | 85.99% | 82.63% | 84.28% |
| The method of the disclosure | 99.45% | 84.34% | 91.28% |

Simulation example 2

This example inputs the screen content image captured by screen snapshot. The settings of parameters are consistent with those of the simulation example 1.

Figure 6:
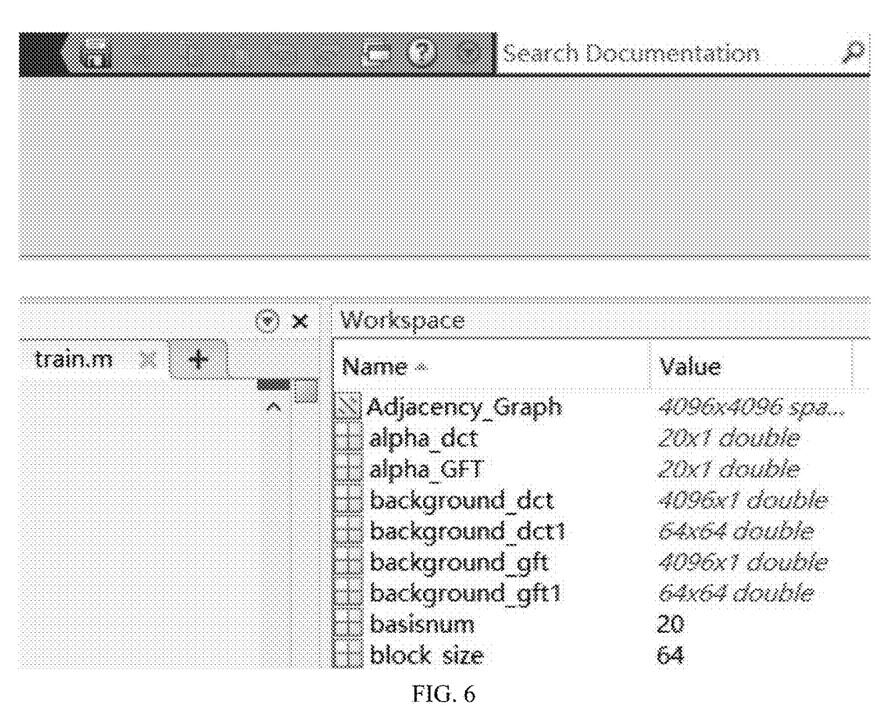
FIG. 6 shows an original image of screen content in a simulation example 2.
Figure 7:
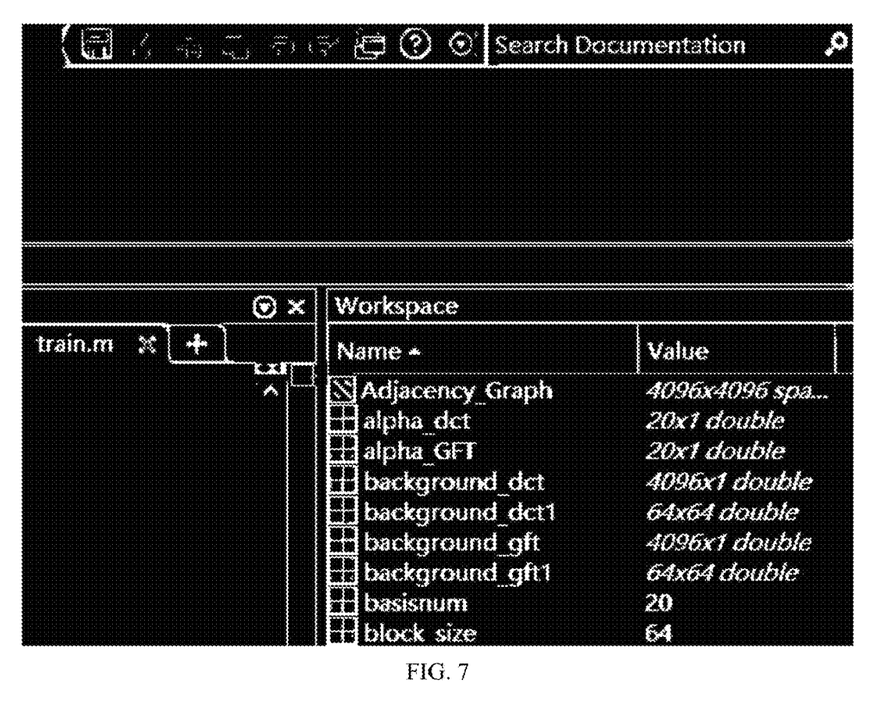
FIG. 7 shows a foreground map by the technical scheme of the disclosure in the simulation example 2.
Figure 8:
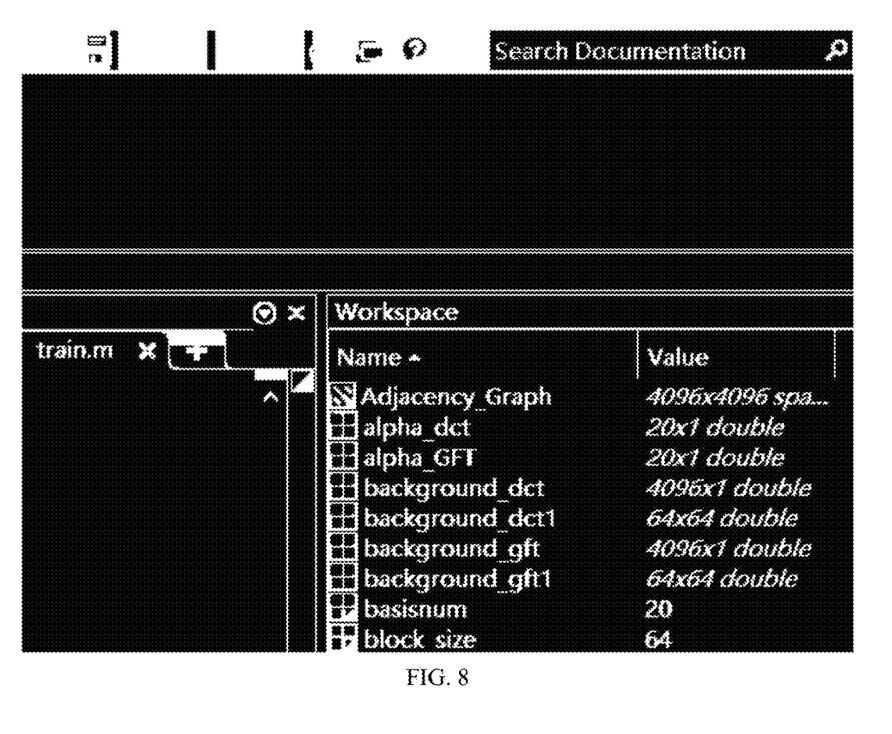
FIG. 8 shows a foreground map by the LAD method in the simulation example 2.
Figure 9:
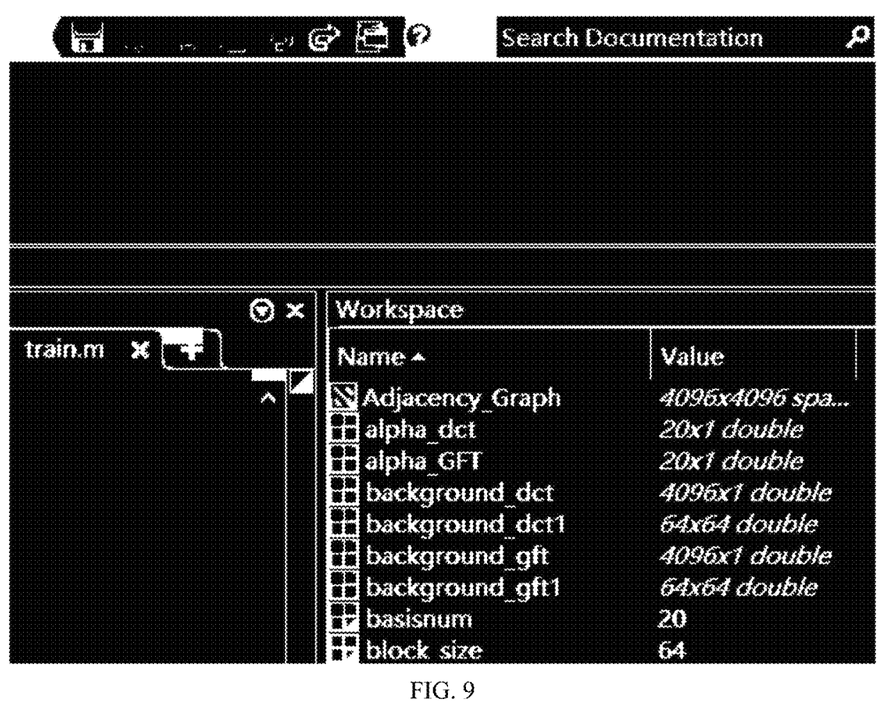
FIG. 9 shows a foreground map by the SDTV method in the simulation example 2.

The screen content image is input into the model of the technical scheme, the comparison of segmentation foreground images are shown in FIGS. 6 to 9, in which FIG. 6 shows an original image, FIG. 7 shows a foreground map by the technical scheme, FIG. 8 shows a foreground map by the LAD method, and FIG. 9 shows a foreground map by the SDTV method. It can be observed that the segmentation effect of the model in the technical scheme is the best.

The above-mentioned embodiments are only preferred embodiments for fully explaining the disclosure, and the scope of protection of the disclosure is not limited thereto. Equivalent substitutions or changes made by those skilled in the art on the basis of the disclosure are within the scope of protection of the disclosure. The scope of protection of the disclosure is subject to the claims.

What is claimed is:

1. A image foreground-background segmentation method based on sparse decomposition and graph Laplacian regularization, executed by a processor, comprising:
   step 1) dividing an image into a plurality of non-overlapping image blocks;
   step 2) establishing a foreground-background segmentation model of the image block, and wherein the foreground-background segmentation model is expressed as follows:

$$\min_{s_r,\alpha_r} \|\alpha_r\|_0 + \tau\|s_r\|_0 + \gamma s_r^T L_{G_r} s_r \quad (3)$$
$$\text{s.t. } f_r = P_r\alpha_r + s_r$$

where $\tau$ and $\gamma$ are regularization parameters; $\|\alpha_r\|_0$ represents minimizing the nonzeros entries of the parameter $\alpha_r$ by using 10-norm; $\|s_r\|_0$ represents foreground pixels $s_r$ where the number of non-zero components are smaller; $S_r^T L_{G_r} S_r$ represents a graph Laplacian regularization term, which is used to characterize connectivity of foreground text and graphics; $f_r = P_r\alpha_r + s_r$ represents a constraint term; $f_r$ corresponds to vectorization of $F_r(x,y)$ and $s_r$ corresponds to vectorization of $S_r(x,y)$; $P_r$ is a matrix with a size $l^2 \times M$, and $\alpha_r = [\alpha_{r,1}, \ldots, \alpha_{r,M}]^T$;

step 3) using a l1-norm to deal with a convex problem according to the foreground-background segmentation model, and obtaining a problem as follows:

$$\min_{s_r,\alpha_r} \|\alpha_r\|_1 + \tau\|s_r\|_1 + \gamma s_r^T L_{G_r} s_r \quad (4)$$
$$\text{s.t. } f_r = P_r\alpha_r + s_r$$

step 4) dividing the problem into a plurality of sub-problems, and solving the plurality of sub-problems by iteration according to the foreground-background segmentation model of the image established by formula (3);
   step 5) after the iteration of the above step 4), obtaining solutions $s_r(r=1, \ldots, r_{max})$ of above problem; matrixing $s_r$, and patching the $s_r$ to obtain as a foreground image of the whole image; and
   step 6) inserting a foreground component into a background image to obtain a synthetic image, and inputting the synthetic image into the foreground-background segmentation model to obtain a foreground image of the synthetic image.

2. The image foreground-background segmentation method based on sparse decomposition and graph Laplacian regularization according to claim 1, wherein the plurality of non-overlapping image blocks in step 1) are obtained by the following manner:
   dividing the image into $r_{max}$ numbers of the non-overlapping image blocks with a size of l×l;

wherein the r-th image block of the $r_{max}$ numbers of the non-overlapping image blocks is expressed as follows:

$$F_r(x, y) = \sum_{m=1}^{M} \alpha_{r,m} P_{r,m}(x, y) + S_r(x, y) \tag{1}$$

where $r=1, \ldots, r_{max}$; x represents a horizontal coordinate and y represents a vertical coordinate;

$\sum_{m=1}^{M} \alpha_{r,m} P_{r,m}(x, y)$ corresponds to a smooth background region, $P_{r,m}(x, y)$ represents a graph Fourier basis; $\alpha_{r,m}$ represents a model parameter; $S_r(x, y)$ corresponds to the foreground pixels; and re-describing formula (1) to formula (2) by vectorizing a matrix into a vector:

$$f_r = P_r \alpha_r + s_r \tag{2}$$

where $f_r$ corresponds to the vectorization of $F_r(x, y)$ and $s_r$ corresponds to the vectorization of $S_r(x, y)$; $P_r$ is the matrix with the size $l^2 \times M$, and $\alpha_r = [\alpha_{r,1}, \ldots, \alpha_{r,M}]^T$.

3. The image foreground-background segmentation method based on sparse decomposition and graph Laplacian regularization according to claim 1, wherein the plurality of sub-problems in step 4) are obtained by the following manner:

before using an alternating direction method of multipliers to solve the problem, rewriting the problem equivalently as follows:

$$\min_{\alpha_r, x_r, y_r, s_r} \|x_r\|_1 + \tau\|y_r\|_1 + \gamma s_r^T L_{G_r} s_r \tag{5}$$

$$\text{s.t. } x_r = \alpha_r, y_r = f_r - P_r \alpha_r, y_r = s_r$$

where $x_r$ is an auxiliary variable, which is equivalent to $\alpha_r$ before equivalent rewriting; $y_r$ is another auxiliary variable, which is equivalent to $s_r$ before equivalent rewriting;

using the alternating direction method of multipliers to express an augmented Lagrangian function of the rewritten problem as follows:

$$\ell(\alpha_r, x_r, y_r, s_r, u_r, v_r, w_r) = \tag{6}$$

$$\|x_r\|_1 + \tau\|y_r\|_1 + \gamma s_r^T L_{G_r} s_r + \langle u_r, x_r - \alpha_r \rangle + \langle v_r, y_r + P_r \alpha_r - f_r \rangle +$$

$$\langle w_r, y_r - s_r \rangle + \frac{\rho}{2}\left(\|x_r - \alpha_r\|_2^2 + \|y_r + P_r \alpha_r - f_r\|_2^2 + \|y_r - s_r\|_2^2\right)$$

where $u_r, v_r, w_r$ represent Lagrange multipliers of a dual variable; $\langle \cdot, \cdot \rangle$ represents an inner product; $\rho$ represents a penalty parameter; and $L_{G_r}$ represents a graph Laplacian matrix;

dividing the rewritten problem into the plurality of sub-problems and solving the plurality of sub-problems one by one by the iteration:

$$\alpha_r^{(k+1)} = \mathop{\mathrm{argmin}}_{\alpha_r} \ell\left(\alpha_r, x_r^{(k)}, y_r^{(k)}, s_r^{(k)}, u_r^{(k)}, v_r^{(k)}, w_r^{(k)}\right) \tag{7}$$

$$x_r^{(k+1)} = \mathop{\mathrm{argmin}}_{x_r} \ell\left(\alpha_r^{(k+1)}, x_r, y_r^{(k)}, s_r^{(k)}, u_r^{(k)}, v_r^{(k)}, w_r^{(k)}\right) \tag{8}$$

$$y_r^{(k+1)} = \mathop{\mathrm{argmin}}_{y_r} \ell\left(\alpha_r^{(k+1)}, x_r^{(k+1)}, y_r, s_r^{(k)}, u_r^{(k)}, v_r^{(k)}, w_r^{(k)}\right) \tag{9}$$

$$s_r^{(k+1)} = \mathop{\mathrm{argmin}}_{s_r} \ell\left(\alpha_r^{(k+1)}, x_r^{(k+1)}, y_r^{(k+1)}, s_r, u_r^{(k)}, v_r^{(k)}, w_r^{(k)}\right) \tag{10}$$

$$u_r^{(k+1)} = u_r^{(k)} + \rho\left(x_r^{(k+1)} - \alpha_r^{(k+1)}\right) \tag{11}$$

-continued $$v_r^{(k+1)} = v_r^{(k)} + \rho\left(y_r^{(k+1)} + P_r \alpha_r^{(k+1)} - f_r\right) \tag{12}$$

$$w_r^{(k+1)} = w_r^{(k)} + \rho\left(y_r^{(k+1)} - s_r^{(k+1)}\right) \tag{13}$$

where argmin* represents a value of the symbol·when the formula * reaches a minimum value;

k represents the k-th iteration; $*^{(k+1)}$ represents a result of the formula * after the (k+1)-th iteration; and $*^{(k)}$ represents a result of the formula * after the k-th iteration.

4. The image foreground-background segmentation method based on sparse decomposition and graph Laplacian regularization according to claim 1, wherein the solving the plurality of sub-problems by the iteration, comprises:

extracting all terms containing $\alpha_r$, $x_r$, $y_r$, $s_r$ from formula (6) respectively;

determining termination conditions of the iteration, and stopping the iteration in response to the termination conditions of the iteration being met; wherein the termination conditions of the iteration are as follows:

$$\|x_r^{(k+1)} - \alpha_r^{(k+1)}\|_\infty \leq \epsilon_1, \|y_r^{(k+1)} + P_r \alpha_r^{(k+1)} - f_r\|_\infty \leq \epsilon_2, \text{ and}$$
$$\|y_r^{(k+1)} - s_r^{(k+1)}\|_\infty \leq \epsilon_3;$$

where $\|\cdot\|_\infty$ is an infinite norm, which represents a maximum absolute value of all elements in a vector; $\epsilon_1, \epsilon_2$, and $\epsilon_3$ are constraint parameters respectively; $\alpha_r^{(k+1)}$ represents a result of $\alpha_r$ after the (k+1)-th iteration; $s_r^{(k+1)}$ represents a result of $s_r$ after the (k+1)-th iteration; $x_r^{(k+1)}$ represents a result of $x_r$ after the (k+1)-th iteration; $x_r$ represents an auxiliary variable, which is equivalent to $\alpha_r$;

$y^{(k+1)}_r$ represents a result of $y_r$ after the (k+1)-th iteration; $y_r$ represents an auxiliary variable, which is equivalent to $s_r$.

5. The image foreground-background segmentation method based on sparse decomposition and graph Laplacian regularization according to claim 4, wherein in step 4), all terms containing $\alpha_r$ are extracted from formula (6) and a first sub-problem of the plurality of sub-problems is solved by the following manner:

$$\alpha_r^{(k+1)} = \mathop{\mathrm{argmin}}_{\alpha_r} \langle u_r^{(k)}, x_r^{(k)} - \alpha_r \rangle + \tag{14}$$

$$\langle v_r^{(k)}, y_r^{(k)} + P_r \alpha_r - f_r \rangle + \frac{\rho}{2}\left(\left\|x_r^{(k)} - \alpha_r\right\|_2^2 + \left\|y_r^{(k)} + P_r \alpha_r - f_r\right\|_2^2\right)$$

wherein a problem of formula (14) is a least squares problem, which has a closed-form solution as follows:

$$\alpha_r^{(k+1)} = (\rho I + \rho P_r^T P_r)^{-1}(u_r^{(k)} - P_r^T v_r^{(k)} + \rho x_r^{(k)} + \rho P_r^T (f_r - y_r^{(k)})) \tag{15}$$

where I represent a unit matrix.

6. The image foreground-background segmentation method based on sparse decomposition and graph Laplacian regularization according to claim 4, wherein in step 4), all terms containing $X_r$ are extracted from formula (6) and a soft thresholding shrinkage operator is used to solve a second sub-problem of the plurality of sub-problems by the following manner:

$$x_r^{(k+1)} = \mathop{\mathrm{argmin}}_{x_r} \|x_r\|_1 + \langle u_r^{(k)}, x_r - \alpha_r^{(k+1)} \rangle + \frac{\rho}{2}\left\|x_r - \alpha_r^{(k+1)}\right\|_2^2 = \tag{16}$$

$$\operatorname*{argmin}_{x_r}\|x_r\|_l + \frac{\rho}{2}\left\|x_r - \left(\alpha_r^{(k+1)} - \frac{u_r^{(k)}}{\rho}\right)\right\|_2^2$$

wherein the soft thresholding shrinkage operator is as follows:

$$\operatorname{soft}(\phi, \Delta) = \begin{cases} \phi - \Delta, & \phi > \Delta \\ \phi + \Delta, & \phi < -\Delta \\ 0, & \text{otherwise} \end{cases} \quad (17)$$

where $\phi \in \mathbb{R}$, $\Delta > 0$; and a solution of the second sub-problem is as follows:

$$x_r^{(k+1)} = \operatorname{soft}\left(\alpha_r^{(k+1)} - \frac{u_r^{(k)}}{\rho}, \frac{1}{\rho}\right) \quad (18)$$

where $\phi$ represents a variable; $\mathbb{R}$ represents a set of real numbers; and $\Delta$ represents a threshold value.

7. The image foreground-background segmentation method based on sparse decomposition and graph Laplacian regularization according to claim 4, wherein in step 4), all terms containing $y_r$ are extracted from formula (6) and a soft thresholding shrinkage operator is used to solve a third sub-problem of the plurality of sub-problems by the following manner:

$$y_r^{(k+1)} = \operatorname*{argmin}_{y_r}\tau\|y_r\|_1 + \langle v_r^{(k)}, y_r + P_r\alpha_r^{(k+1)} - f_r\rangle + \langle w_r^{(k)}, y_r - s_r^{(k)}\rangle + \frac{\rho}{2}(\|y_r + P_r\alpha_r^{(k+1)} - f_r\|_2^2 + \|y_r - s_r^{(k)}\|_2^2) = \quad (19)$$

$$\operatorname*{argmin}_{y_r}\tau\|y_r\|_1 + \rho\left\|y_r - \frac{1}{2}\left(f_r + s_r^{(k)} - P_r\alpha_r^{(k+1)} - \frac{1}{\rho}(v_r^{(k)} + w_r^{(k)})\right)\right\|_2^2 =$$

$$\operatorname{soft}\left(\frac{1}{2}\left(f_r + s_r^{(k)} - P_r\alpha_r^{(k+1)} - \frac{1}{\rho}(v_r^{(k)} + w_r^{(k)})\right), \frac{\tau}{2\rho}\right)$$

where $\tau$ represents the regularization parameter.

8. The image foreground-background segmentation method based on sparse decomposition and graph Laplacian regularization according to claim 4, wherein in step 4), all terms containing $s_r$ are extracted from formula (6) and a fourth sub-problem is solved by the following manner:

$$s_r^{(k+1)} = \operatorname*{argmin}_{s_r}\gamma s_r^T L_{\mathcal{G}_r} s_r + \langle w_r^{(k)}, y_r^{(k)} - s_r\rangle + \frac{\rho}{2}\|y_r^{(k+1)} - s_r\|_2^2 = \quad (20)$$

$$(2\gamma L_{\mathcal{G}_r} + \rho I)^{-1}(w_r^{(k)} + \rho y_r^{(k+1)})$$

wherein $u_r$ is obtained after the iteration:

$$u_r^{(k+1)} = u_r^{(k)} + \rho(x_r^{(k+1)} - \alpha_r^{(k+1)}) \quad (21)$$

wherein $v_r$ is obtained after the iteration:

$$v_r^{(k+1)} = v_r^{(k)} + \rho(y_r^{(k+1)} + P_r\alpha_r^{(k+1)} - f_r) \quad (22)$$

wherein $w_r$ is obtained after the iteration:

$$w_r^{(k+1)} = w_r^{(k)} + \rho(y_r^{(k+1)} - s_r^{(k+1)}) \quad (23)$$

where $L_{G_r}$ represents a graph Laplacian matrix.

9. An image foreground-background segmentation system based on sparse decomposition and graph Laplacian regularization, comprising: a memory, the processor and a computer program stored in the memory and executable on the processor, wherein the processor is configured, when executing the computer program, to implement the method according to claim 1.

* * * * *